(12) United States Patent
Yu

(10) Patent No.: US 7,643,279 B1
(45) Date of Patent: Jan. 5, 2010

(54) COMPUTER WITH DISPLAY PANEL MOUNTED THEREON

(75) Inventor: Hung-Huei Yu, Taipei (TW)

(73) Assignee: Shuttle Inc., Taipei (TW)

( * ) Notice: Subject to any disclaimer, the term of this patent is extended or adjusted under 35 U.S.C. 154(b) by 0 days.

(21) Appl. No.: 12/144,270

(22) Filed: Jun. 23, 2008

(51) Int. Cl.
*G06F 1/16* (2006.01)

(52) U.S. Cl. ............................ 361/679.27; 361/679.21; 312/223.3; 248/917; 713/2; 345/506

(58) Field of Classification Search ............ 361/679.06, 361/679.21, 679.33, 679.56; 312/223.1–223.6; 248/917, 918, 919; 713/2, 23; 345/31, 173, 345/419, 506
See application file for complete search history.

(56) References Cited

U.S. PATENT DOCUMENTS

| 6,697,250 B2 * | 2/2004 | Kuo ........................ 361/679.6 |
| 2007/0064385 A1 * | 3/2007 | Paul et al. .................... 361/687 |
| 2009/0113197 A1 * | 4/2009 | Kochar et al. .................. 713/2 |

FOREIGN PATENT DOCUMENTS

| TW | 558027 | 10/2003 |
| TW | 200742958 | 11/2007 |

* cited by examiner

*Primary Examiner*—Hung V Duong
(74) *Attorney, Agent, or Firm*—Chun-Ming Shih

(57) ABSTRACT

The present invention discloses a computer with a display panel mounted thereon, which comprises: a frame structure, a display panel and at least one casing board covering the frame structure. The frame structure further comprises: a front frame, a rear frame, a baseplate connecting the bottoms of the front frame and the rear frame, and two support bars connecting the tops of the front frame and the rear frame. The front and rear frames, the baseplate and the support bars define an accommodation space inside the frame structure and at least four installation planes encasing the accommodation space. The display panel is installed on an arbitrary installation plane and electrically connected to the motherboard to receive video signals and present images. The casing boards are installed on the other installation planes where no display panel is installed.

13 Claims, 3 Drawing Sheets

COMPUTER WITH DISPLAY PANEL MOUNTED THEREON

FIELD OF THE INVENTION

The present invention relates to a computer, particularly to a computer with a display panel mounted thereon.

BACKGROUND OF THE INVENTION

A display device with a display panel is used to present computational outputs. Generally, a display device is an independent unit separated from a computer. A display device is electrically coupled to a computer to receive video signals from the computer and present images. As a display device and a computer are both independent devices, they should occupy considerable space. For example, a PC (Personal Computer) usually has to connect with at least one external display device to present the computational results or the stored information. Now, the traditional CRT (Cathode Ray Tube) display device is usually replaced by an FPD (Flat Panel Display) device having a much smaller volume, such as LCD (Liquid Crystal Display). However, the placement of an FPD device still troubles users. For example, when the space is limited, an FPD device will crowd out other accessory devices, such as a keyboard or a mouse. With the development of digital products, computers are widely used in home multimedia systems to function as a signal source for a large-size display device. When a video or pictures are playing, a user cannot view process-control information or browse webpages unless he interrupts video playing, which will interfere with the other audience. Refer to Taiwan patents No. 558027 and No. 200742958, wherein a display device is integrated with a computer. The abovementioned prior arts indeed reduce the space occupied by a computer and a display device. However, the irregular protrudent surfaces thereof impair the collocation of the computer and other A/V devices, such as an audio amplifier, or even harm aesthetics of the entire appearance.

SUMMARY OF THE INVENTION

The primary objective of the present invention is to integrate a display device with a computer to reduce the occupied space. To achieve the objective, the present invention proposes a computer with a display panel mounted thereon, which comprises: a frame structure, a display panel and at least one casing board covering the frame structure. The frame structure further comprises: a front frame, a rear frame, a baseplate connecting the bottoms of the front frame and the rear frame, and two support bars connecting the tops of the front frame and the rear frame. The front and rear frames, the baseplate and the support bars define an accommodation space inside the frame structure cad at least four installation planes encasing the accommodation space. The accommodation space accommodates a motherboard and at least one electronic device selected from a group consisting of (a) a hard drive, (b) an optical drive, (c) an I/O card, (d) a memory card, (e) a sound card, (f) a display card, (g) a network card, (h) a power supply, or accommodates a motherboard or a combination of the abovementioned electronic devices. The display panel is installed on an arbitrary installation plane and electrically connected to the motherboard to receive video signals and present images. The casing boards are installed on the redundant installation planes where no display panel is installed.

The installation plane where the display panel is installed has a cover structure. The cover structure has a first installation opening to reveal the display panel. The cover structure and the installation plane respectively have press-fit elements and press-fit slots corresponding to each other, whereby the cover structure is secured to the frame structure. The cover structure also has an opening to reveal the optical drive. Further, the cover structure has at least one component selected from the group consisting of a power switch, a signal connection port, an indicator, a brightness adjustment switch, and a contrast adjustment switch, or has a combination of the abovementioned components.

The display panel can be tilted to a certain angle to make users watch the pictures on the display panel easily. The display panel is fixed to the frame structure or the casing board with a fixing element. For the expandability of the computer system of the preset invention, another casing board has an installation bay where an external electronic device can be installed, and the installation bay has a signal connection port thereinside corresponding to the external electronic device.

In another embodiment, the display panel has a touch control module, which can output touch control signals to the motherboard, whereby the user can operate the computer via touching the pictures on the display panel.

In a further embodiment, the frame structure also has a second installation opening corresponding to the display panel, whereby the display panel can be securely installed on the frame structure.

The computer with a display panel mounted thereon of the present invention integrates a computer and a display panel into a single electronic device to reduce the occupied space and promote space-efficiency. Further, the display panel is directly installed on the installation plane of the frame structure, and the computer of the present invention has none structure protruding from the computer itself. Thus, the present invention will not interfere with the arrangement of other electronic devices. Therefore, the user can make the best of space.

DETAILED DESCRIPTION OF THE PREFERRED EMBODIMENTS

Below, the technical contents of the present invention are described in detail in cooperation with the drawings.

Figure 1:
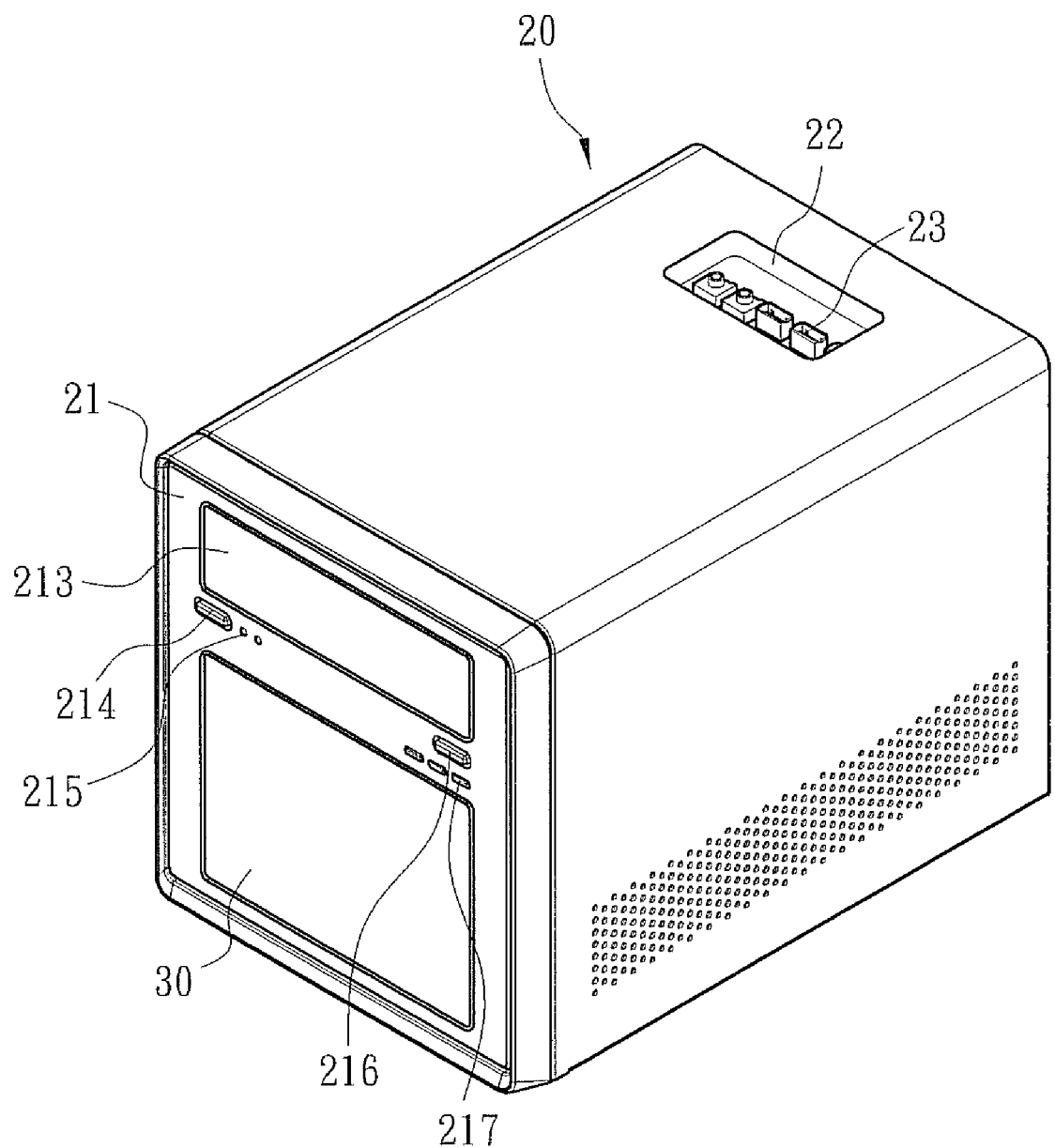
FIG. 1 is a perspective view of a computer with a display panel mounted thereon according to a preferred embodiment of the present invention.
Figure 2:
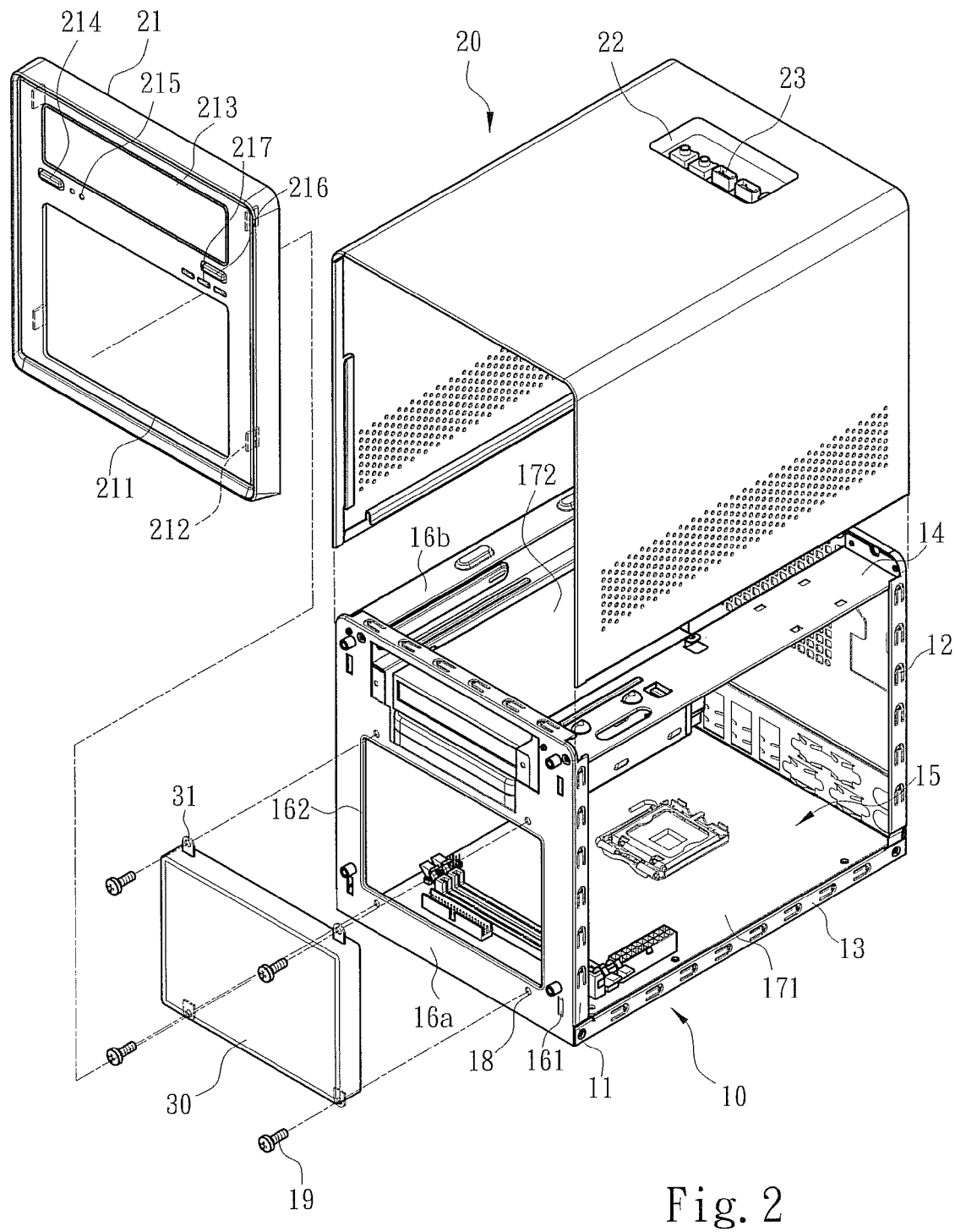
FIG. 2 is an exploded view of a computer with a display panel mounted thereon according to a preferred embodiment of the present invention.

Refer to FIG. 1 and FIG. 2 respectively a perspective view and an exploded view of a computer with a display panel mounted thereon according to a preferred embodiment of the present invention. The computer with a display panel mounted thereon of the present invention comprises: a frame structure 10, a display panel 30 and at least one casing board 20 covering the frame structure 10. The frame structure 10 further comprises: a front frame 11, a rear frame 12, a baseplate 13 connecting the bottoms of the front frame 11 and the rear frame 12, and two Support bars 14 connecting the tops of the front frame 11 and the rear frame 12. The front and rear frames 11 and 12, the baseplate 13 and the support bars 14 define an accommodation space 15 inside the frame structure 10 and at least four installation planes 16a and 16b encasing the accommodation space 15. The accommodation space 15 accommodates a motherboard 171, optical drives 172, hard drives, I/O cards, memory cards, a sound card, a display card, a network card, a power supply, etc. Only the motherboard and the optical drive are respectively designated with 171 and 172 to represent the common electronic components, and the designation of other components is omitted herein. The display panel 30 is installed on the arbitrary installation plane 16a and electrically connected to the motherboard 171 to receive video signals and present images. The casing boards 20 are installed on the redundant installation planes 16b where no display panel 30 is installed. In this embodiment, the casing boards 20 may be separate workpieces respectively installed on the installation planes 16b or a one-piece component.

In this embodiment, the installation plane 16a where the display panel 30 is installed has a cover structure 21. The cover structure 21 has a first installation opening 211 to reveal the display panel 30. The cover structure 21 and the installation plane 16a respectively have press-fit elements 212 and press-fit slots 161 corresponding to 10 each other, whereby the cover structure 21 is secured to the frame structure 10. The cover structure 21 also has an opening 213 to reveal the optical drive 172. Further, the cover structure 21 has a power switch 214, signal connection ports, such as USB ports (not shown in the drawings), indicators 215, a brightness adjustment switch 216, a contrast adjustment switch 217, etc. The installation plane 16a of the frame structure 10 also has a second installation opening 162 corresponding to the display panel 30, whereby the display panel 30 can be securely installed on the frame structure 10. The display panel 30 can be tilted to a certain angle to make users 20 watch the pictures on the display panel 30 easily, and the tilt angle is preferably 7-30 degrees in this embodiment.

In this embodiment, the installation plane 16a of the frame structure 10 and the display panel 30 respectively have first fixing portions 18 and second fixing portions 31, and at least one fixing element 19 pass through the first and second fixing portions 18 and 31 to fix the display panel 30 to the installation plane 16a.

Alternatively, the display panel 30 is fixed to the cover structure 21 with the fixing elements 19. For the expandability of the computer system of the preset invention, the casing board 20 has an installation bay 22 where an external electronic device (not shown in the drawings) can be installed, and the installation bay 22 has a signal connection port 23 thereinside corresponding to the external electronic device. The external electronic device exchanges data with the motherboard 171 via a signal transmission cable or via directly inserting the external electronic device into the signal connection port 23. Further, the display panel 30 may present the data stored in the external electronic device.

In the present invention, the display panel 30 may be an LCD (Liquid Crystal Display) panel. Further, the LCD panel may have a touch control module to function as a touch panel, which can output touch control signals to the motherboard 171.

Therefore, the computer with a display panel mounted thereon of the present invention integrates a computer and a display panel into a single electronic device, which can reduce the occupied space and promote space-efficiency. Further, the display panel is directly installed on the installation plane of the frame structure. Therefore, the computer of the present invention has none structure protruding from the computer itself and will not interfere with the arrangement of other electronic devices. Thus is achieved a neat arrangement of the electronic devices.

Figure 3:
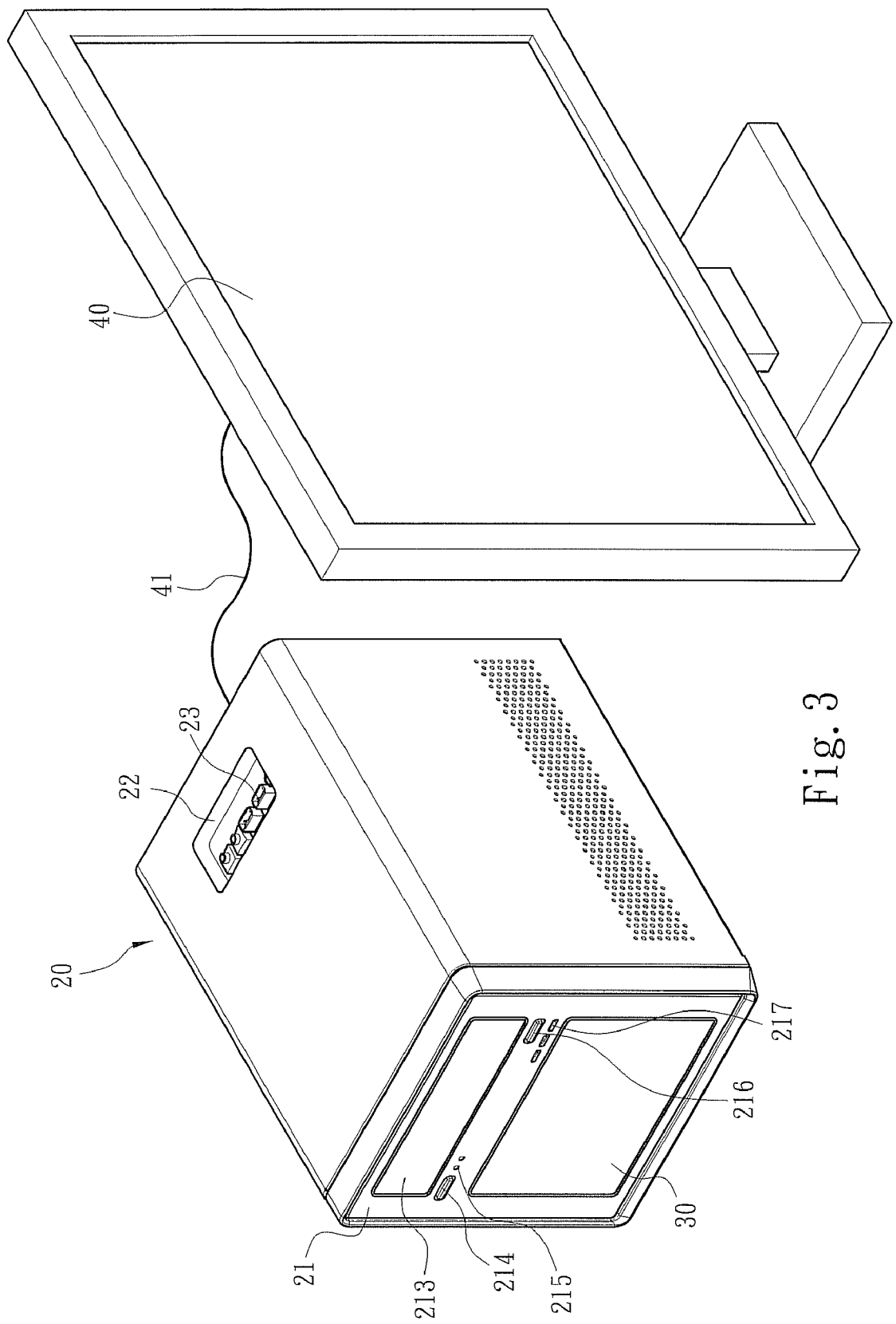
FIG. 3 is a diagram schematically showing the cooperation of the present invention and an external display device.

Refer to FIG. 3 a diagram schematically showing the cooperation of the present invention and an external display panel. The computer with a display panel mounted thereon of the present invention can output video signals to an external display device 40 via a video signal transmission cable 41. The motherboard 171 can transmit identical or different video signals to the display panel 30 and the external display device 40. When the computer with a display panel mounted thereon of the present invention is applied to a home multimedia system, the external display device 40 will be used to play high-quality video or pictures, and the display panel 30 mounted on the computer itself will be used to present information about the video or pictures or used to facilitate the operations independent of video playing, such as browsing webpages or arranging data.

The computer with a display panel mounted thereon of the present invention integrates a computer and a display panel into a single electronic device, and thus can effectively solve the conventional problem that space is occupied by both a computer and a display device. Therefore, the present invention can make a user have more space available. When the present invention cooperates with an external display device, the display panel mounted on the computer can function as a monitor independent of the external display device. The user can acquire the related information of video playing or undertake other operations, such as browsing webpages without interfering with the video playing of the external display device. Therefore, the present invention has improvements over the conventional technologies and meets the conditions for a patent. Thus, the Inventor files the application for a patent. It will be appreciated if the patent is approved fast.

The embodiments described above are only to exemplify the present invention but not to limit the scope of the present invention. Therefore, any equivalent modification or variation according to the spirit of the present invention is to be also included within the scope of the present invention.

What is claimed is:

1. A computer with a display panel mounted thereon comprising:
    a frame structure, further comprises: a front frame, a rear frame, a baseplate connecting the bottoms of said front frame and said rear frame, and two support bars connecting the tops of said front frame and said rear frame, wherein said front frame, said rear frame, said baseplate and said support bars define an accommodation space inside said frame structure and at least four installation planes encasing said accommodation space, and wherein said accommodation space accommodates a motherboard and at least one electronic device selected from a group consisting of (a) a hard drive, (b) an optical drive, (c) an I/O card, (d) a memory card, (e) a sound card, (f) a display card, (g) a network card, (h) a power supply, or accommodates a motherboard or a combination of the above-mentioned electronic devices;
    a display panel, installed on an arbitrary said installation plane and electrically connected to said motherboard to receive video signals and present images;
    at least one casing board, installed on other said installation planes where no display panel is installed, and covering said frame structure.

2. The computer with a display panel mounted thereon according to claim 1, wherein said installation plane of said display panel is installed has a cover structure having a first installation opening to reveal said display panel.

3. The computer with a display panel mounted thereon according to claim 2, wherein said cover structure and said installation plane respectively have press-fit elements and press-fit slots corresponding to each other.

4. The computer with a display panel mounted thereon according to claim 2, wherein said cover structure has an opening.

5. The computer with a display panel mounted thereon according to claim 2, wherein said cover structure has at least one component selected from a group consisting of a power switch, a signal connection port, an indicator, a brightness adjustment switch, a contrast adjustment switch, or has a combination of the abovementioned components.

6. The computer with a display panel mounted thereon according to claim 2, wherein said cover structure and said display panel respectively have at least one first fixing portion and at least one second fixing portion, and at least one fixing element passes through said first fixing portion and said second fixing portion to fix said second fixing portion to said first fixing portion.

7. The computer with a display panel mounted thereon according to claim 1, wherein said installation plane and said display panel respectively have at least one first fixing portion and at least one second fixing portion, and at least one fixing element pass through said first fixing portion and said second fixing portion to fix said second fixing portion to said first fixing portion.

8. The computer with a display panel mounted thereon according to claim 1, wherein said frame structure has a second installation opening corresponding to said display panel.

9. The computer with a display panel mounted thereon according to claim 1, wherein at least one of said casing boards has an installation bay where an external electronic device can be installed.

10. The computer with a display panel mounted thereon according to claim 9, wherein said installation bay has a signal connection port thereinside corresponding to said external electronic device.

11. The computer with a display panel mounted thereon according to claim 1, wherein the surface of said display panel has a tilt angle.

12. The computer with a display panel mounted thereon according to claim 11, wherein said tilt angle is between 7 and 30 degrees.

13. The computer with a display panel mounted thereon according to claim 1, wherein said display panel has a touch control module, which can output touch control signals to said motherboard.

* * * * *